(12) United States Patent
Pilz

(10) Patent No.: US 9,823,102 B2
(45) Date of Patent: Nov. 21, 2017

(54) ELECTRONIC CIRCUIT, FIELD DEVICE COMPRISING AT LEAST ONE SUCH ELECTRONIC CIRCUIT AND METHOD

(71) Applicant: Endress + Hauser Conducta Gesellschaft für Mess-und Regeltechnik mbH + Co. KG, Gerlingen (DE)

(72) Inventor: Stefan Pilz, Geithain (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 258 days.

(21) Appl. No.: 14/748,410

(22) Filed: Jun. 24, 2015

(65) Prior Publication Data

US 2016/0006261 A1    Jan. 7, 2016

(30) Foreign Application Priority Data

Jun. 25, 2014    (DE) .......................... 10 2014 108 871

(51) Int. Cl.
*H02J 5/00*         (2016.01)
*H02J 7/02*         (2016.01)
*G01D 21/00*        (2006.01)

(52) U.S. Cl.
CPC .............. *G01D 21/00* (2013.01); *H02J 5/005* (2013.01); *H02J 7/025* (2013.01)

(58) Field of Classification Search
CPC ... H03D 5/00; H04B 1/10; H04B 1/16; H04B 15/00; H02J 5/005; H02J 7/025
See application file for complete search history.

(56) References Cited

U.S. PATENT DOCUMENTS 2,335,335 A * 11/1943 Zenner ................. H04M 11/062
                                                                   178/89
3,911,478 A * 10/1975 Rhodes .................... H03D 1/10
                                                                   348/192

(Continued)

FOREIGN PATENT DOCUMENTS

DE            4414676 C1    6/1995
DE       102007048812 A1    4/2009

(Continued)

OTHER PUBLICATIONS

German Search Report, German PTO, Munich, dated Jan. 14, 2015.

*Primary Examiner* — Levi Gannon
(74) *Attorney, Agent, or Firm* — Mark A. Logan; PatServe

(57) ABSTRACT

An electronic circuit for demodulating a carrier signal, for modulating a wanted signal and for supplying a consumer with power. The carrier signal is an alternating signal having a positive half-wave and a negative half-wave, comprising: a galvanically isolating, especially an inductive, interface with a first contact and a second contact, wherein the carrier signal is applied to the interface; a bridge rectifier having a first diode, second diode, third diode and fourth diode connected to the interface. The first diode and the second diode are conducting in the case of a positive half-wave, wherein the first contact of the interface is connected with the anode of the first diode, wherein the third diode and the fourth diode are conducting in the case of a negative half-wave, and wherein the second contact of the interface is connected with the anode of the third diode; a supply circuit, which is connected to the cathode of the first diode. A demodulation circuit is provided, which is connected to the cathode of the third diode; a modulation circuit, which is connected with the first contact; and the consumer, wherein the output of the demodulation circuit and the (Continued)

output of the supply circuit are connected with the consumer. The invention relates further to a field device comprising at least one such circuit as well as to a method.

8 Claims, 4 Drawing Sheets

(56) References Cited

U.S. PATENT DOCUMENTS

| | | | | |
|---|---|---|---|---|
| 4,804,054 | A * | 2/1989 | Howson | A61B 17/3403 128/897 |
| 5,736,967 | A * | 4/1998 | Kayser | G06F 3/147 340/5.91 |
| 6,047,535 | A | 4/2000 | Schroers | |
| 6,307,428 | B1 * | 10/2001 | Nebel | G06K 7/0008 329/311 |
| 8,396,683 | B2 | 3/2013 | Buschnakowski | |
| 2013/0153564 | A1 | 6/2013 | Bogel | |

FOREIGN PATENT DOCUMENTS

| | | |
|---|---|---|
| DE | 202012102446 U1 | 9/2012 |
| DE | 102011088918 A1 | 6/2013 |
| EP | 0897999 A2 | 2/1999 |

\* cited by examiner

ELECTRONIC CIRCUIT, FIELD DEVICE COMPRISING AT LEAST ONE SUCH ELECTRONIC CIRCUIT AND METHOD

TECHNICAL FIELD

The invention relates to an electronic circuit for demodulating a carrier signal, for modulating a wanted signal and for supplying a load with power. The invention relates further to a field device comprising at least one such electronic circuit and to a method for demodulating a carrier signal, for modulating a wanted signal and for supplying a consumer with power.

BACKGROUND DISCUSSION

The basic construction of a field device includes a superordinated unit, e.g. as transmitter, which is connected via a cable with a load, e.g. a sensor. The communication of the sensor with the transmitter is controlled by a microcontroller, in general a data processing unit.

The connection of cable to sensor occurs frequently via a plugged connection, for example, a galvanically decoupled, especially an inductive, interface. In this way, electrical signals can be transmitted contactlessly. This galvanic isolation provides advantages as regards corrosion protection, potential isolation, preventing mechanical wear of the plug, etc. The inductive interface is usually embodied as a system having two coils, which are, for example, plugged into one another. Moreover, energy is transmitted via this interface. Only a certain maximum power can be withdrawn from the interface.

Such inductively coupling, plug connection couplings with at least one primary and one secondary winding are sold by the applicant under the "Memosens" mark.

FIG. 1 shows the state of the art. The mentioned sensors with inductive energy- and communication interface utilize for electrical current supply as well as for communication the alternating voltage, which is induced on their coil L1. In order to be able to utilize the alternating voltage for electrical current supply, it is rectified. The positive half-wave of the alternating voltage is rectified via a first one way rectification D1 and then utilized for the positive operating voltage $U_{R2}$ (schematically on the load R2). IC1 is, in such case, a fixed voltage regulator. The negative half-wave is rectified via a second one way rectification D4 and then utilized both for the negative operating voltage $U_{R3}$ (schematically on the load R3) and also for the receipt of telegrams $U_{C2}$. The sending of telegrams is implemented via load modulation (on R4 and C4). The thereto necessary load switch W1 is operated referenced to ground, since it is connected with the circuit ground.

If a sensor is constructed according to FIG. 1, there is, for example, on average 3 mW available at the positive operating voltage $U_{R2}$, and 1 mW at the negativen operating voltage $U_{R3}$.

Certain sensor types require no negative operating voltage. Others take so little power from the negative operating voltage that the negative voltage can also be produced via auxiliary circuits, e.g. charge pumps. If these sensors have the above described classical arrangement according to the state of the art, almost the entire available power of the negative operating voltage is not utilized and instead is converted into heat. For example, a power of about 0.8 mW is converted "only" into heat. It is desirable to be able to use this power supplementally as positive supply voltage.

SUMMARY OF THE INVENTION

An object of the invention is to provide a circuit, which enables both demodulation and modulation of signals, as well as also sufficient energy on the positive half-wave for a downstream connected consumer.

The object is achieved by an electronic circuit for demodulating a carrier signal, for modulating a wanted signal and for supplying a consumer with power, wherein the carrier signal is an alternating signal with a positive half-wave and a negative half-wave, comprising: a galvanically isolating, especially an inductive, interface with a first contact and a second contact; wherein the carrier signal is applied to the interface, a bridge rectifier having a first diode, second diode, third diode and fourth diode connected to the interface; wherein the first diode and the second diode are conducting in the case of a positive half-wave, wherein the first contact of the interface is connected with the anode of the first diode, wherein the third diode and the fourth diode are conducting in the case of a negative half-wave, and wherein the second contact of the interface is connected with the anode of the third diode; a supply circuit, which is connected to the cathode of the first diode; a demodulation circuit, which is connected to the cathode of the third diode; a modulation circuit, which is connected with the first contact; and the consumer, wherein the output of the demodulation circuit and the output of the supply circuit are connected with the consumer.

It is, thus, possible to supply the power of the negative half-wave via the rectification for the most part to the positive operating voltage.

In an advantageous embodiment, the demodulation circuit includes at least one RC unit, and at least the resistor is connected, in given cases, via other components, with the consumer. This represents a simple type of demodulation.

In a preferred form of embodiment, the modulation circuit is a circuit for generating a load modulation. Especially, the modulation circuit includes a resistor and, in given cases, a capacitor connected in parallel. This is an established method of modulation.

Preferably, the modulation circuit includes a switch, especially a transistor, preferably a field effect transistor, especially preferably a MOSFET, especially preferably a normally blocking, n-channel MOSFET.

Advantageously, the supply circuit includes a smoothing capacitor and a voltage controller, especially a fixed voltage regulator, or a direct voltage converter for generating a stable, smoothed, voltage supply for the downstream consumer.

The object is further achieved by a field device comprising at least one electronic circuit such as described above.

In an advantageous form of embodiment, the field device comprises a conductivity sensor, an oxygen sensor or an optical sensor, especially a turbidity sensor or a sensor for optically determining pH-value.

Especially preferably, the field device includes a second interface corresponding to the first interface, wherein the second interface is a galvanically isolating, especially inductive, interface, wherein the carrier signal, wanted signal and power are transmitted via the first interface and the second interface. The galvanic isolation provides advantages as regards corrosion protection, potential isolation, preventing mechanical wear of the plug, etc.

In such case, the field device includes a second supply circuit, a second demodulation circuit and a second modulation circuit, wherein the second supply circuit, the second demodulation circuit and the second modulation circuit are connected with the second interface.

The object is further achieved by a method for demodulating a carrier signal, for modulating a wanted signal and for supplying a consumer with power, wherein the carrier signal is an alternating signal having a positive half-wave and a negative half-wave, comprising steps as follows: out-coupling the carrier signal from a galvanically isolated, especially an inductive, interface; rectifying the carrier signal; supplying the consumer via a supply circuit; demodulating the carrier signal by a demodulation circuit; wherein the demodulation circuit is connected with the consumer, and modulating the wanted signal.

BRIEF DESCRIPTION OF THE DRAWINGS

The invention will now be explained in greater detail based on the drawing, the figures of which show as follows.

Figure 1:
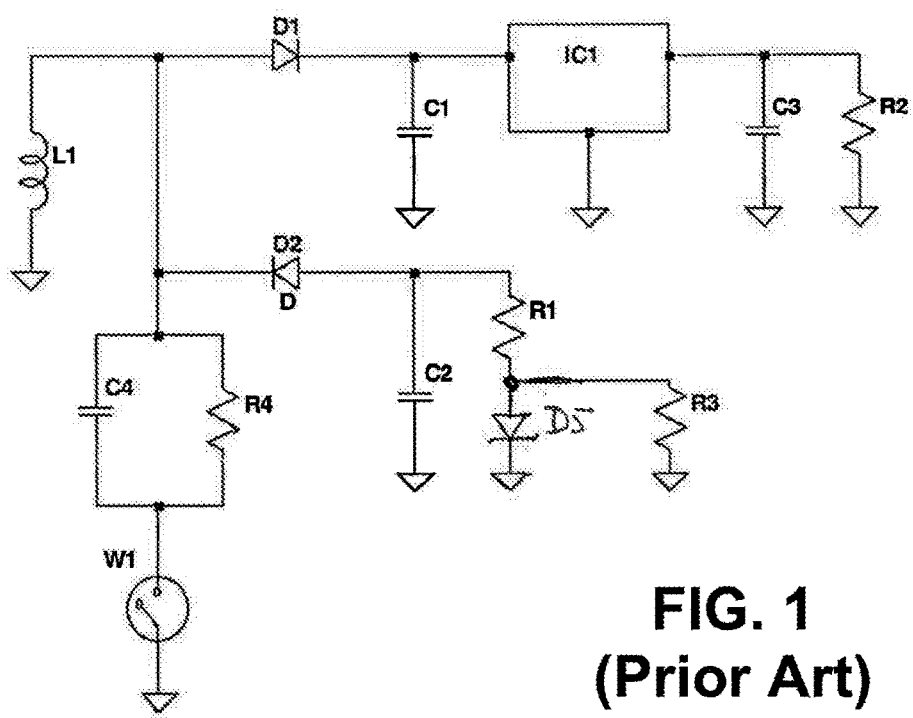
FIG. 1 is an electronic circuit of the prior art.

In the figures, equal features are provided with equal reference characters.

DETAILED DESCRIPTION IN CONJUNCTION WITH THE DRAWINGS

Figure 2:
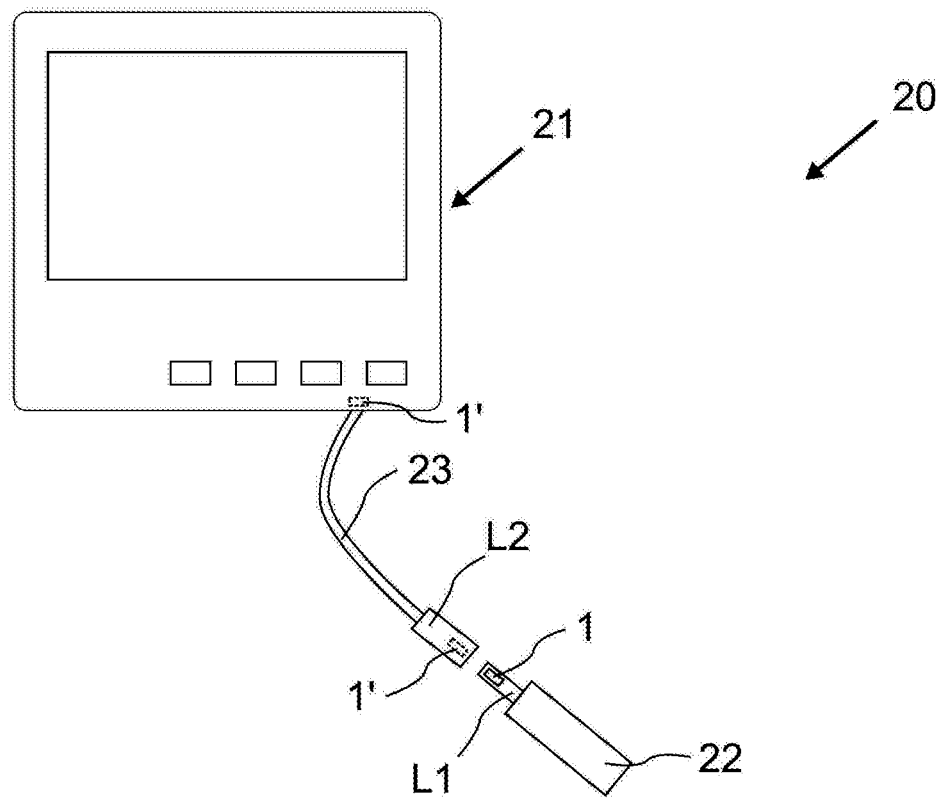
FIG. 2 is a field device of the invention.

First, a field device 20 of the invention will be explored, in the case of which the electronic circuit 1 of the invention can be applied. Such field device 20 is shown in FIG. 2. Via an interface L1, a consumer, for instance, a sensor 22, communicates with a superordinated unit, for instance, directly with a control system or with a transmitter 21, also called a measurement transmitter. Without limitation, it will be assumed in the following that the sensor 22 is connected to a transmitter 21. Provided on the transmitter 21 is a cable 23, on whose other end an interface L2 complementary to the first interface L1 is provided. The interfaces L1, L2 are embodied as galvanically separated, especially as inductive, interfaces, which can be coupled with one another, for example, by means of a mechanically plugged connection. Sent through the interfaces L1, L2 are data (bidirectionally), thus the carrier signal and the wanted signal (see below), and energy, thus power, (unidirectionally, i.e. from the transmitter 21 to the sensor 22).

The field device 20 is predominantly applied in process automation. The sensor 22 is, thus, for instance, a pH-, redox-potential-, also ISFET-, temperature-, conductivity-, pressure-, oxygen-, especially dissolved oxygen-, or carbon dioxide sensor; an ion-selective sensor; an optical sensor, especially a turbidity sensor, a sensor for optically determining oxygen concentration, or a sensor for determining number of cells and cell structures; a sensor for monitoring certain organic or metal compounds; a sensor for determining concentration of a chemical substance, for example, a certain element or a certain compound; or a biosensor, e.g. a glucose sensor. Especially advantageously, the invention is applied in a conductivity sensor, a oxygen sensor or an optical sensor, especially a turbidity sensor or a sensor for optically determining pH-value.

The electronic circuit 1 of the invention is located in a first embodiment in the sensor 22. Fundamentally, the circuit 1 can also be used in the transmitter 21. Alternatively, the circuit can also be used on the sensor side end of the cable 23. The two latter options are drawn dashed in FIG. 2 and provided with the reference characters 1'. In the following, it should, however, be assumed—when not otherwise described—that the circuit 1 is applied on the sensor side.

Figure 3A:
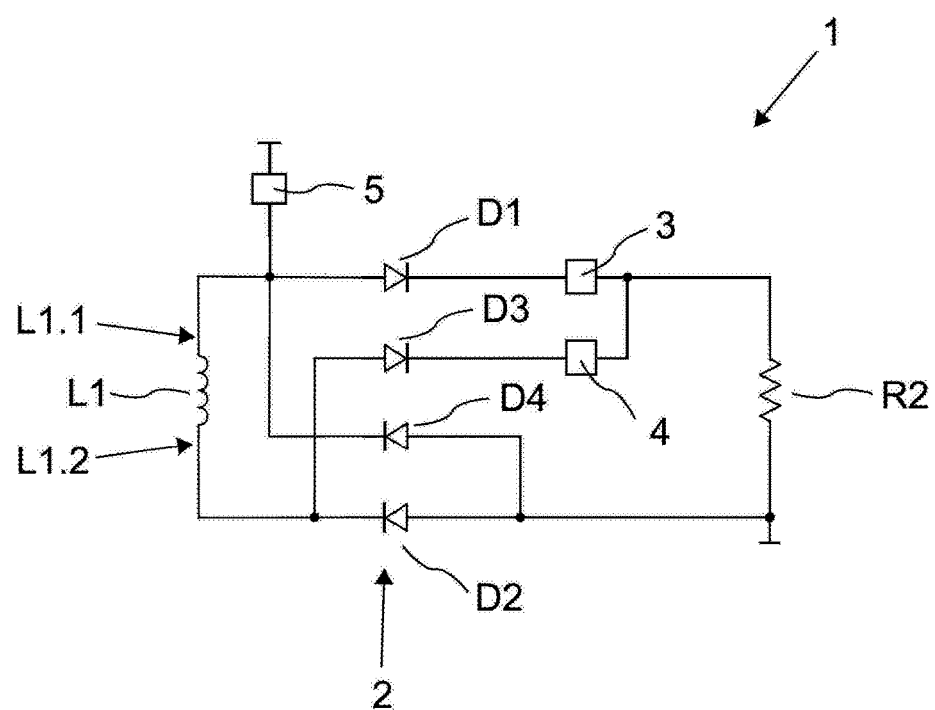
FIG. 3a is an electronic circuit of the invention.
Figure 3B:
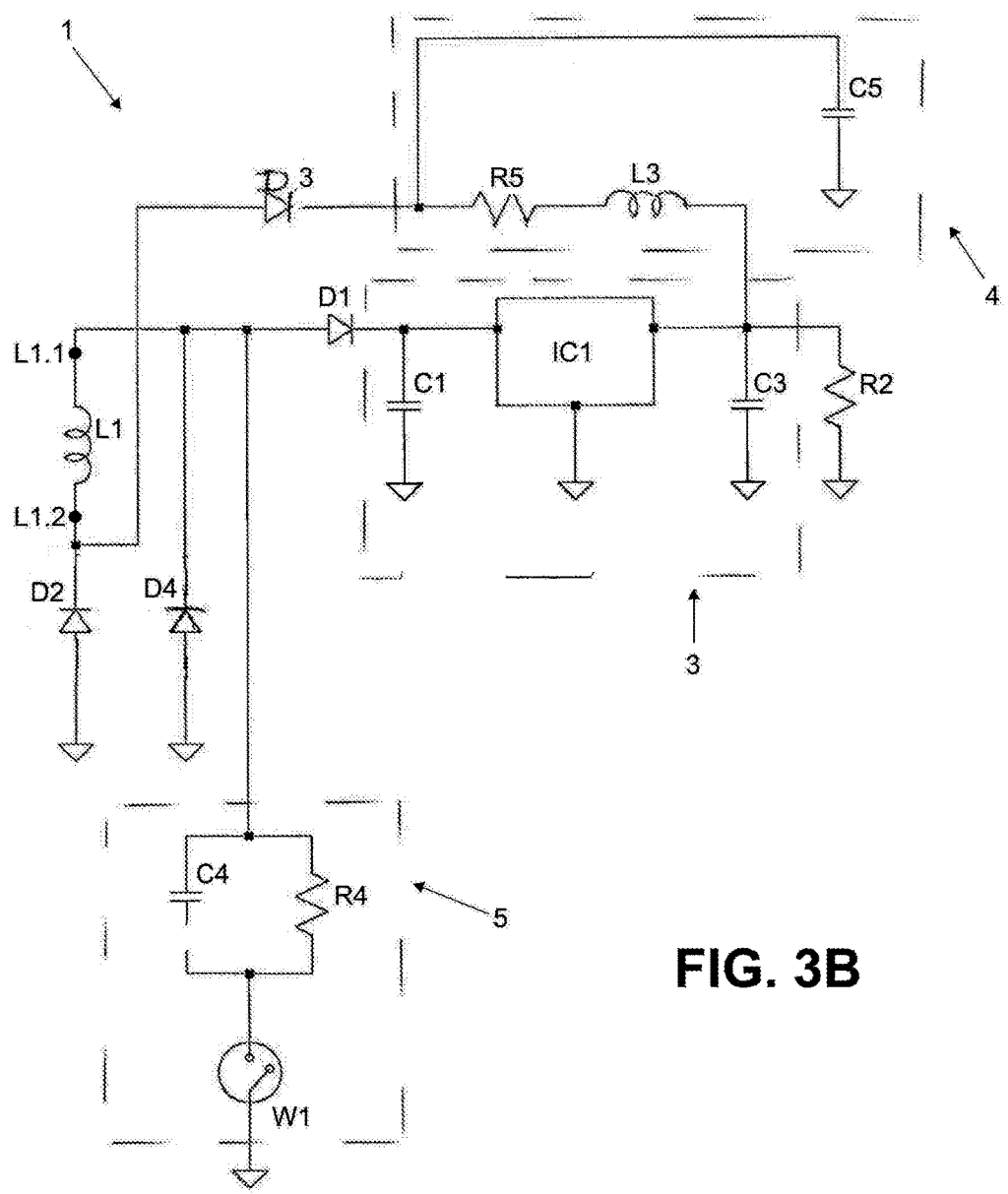
FIG. 3b is the electronic circuit of the invention in a concrete embodiment.

The circuit 1 in its totality is given the reference character 1 and is schematically shown in FIG. 3a as well as in the form of a concrete embodiment in FIG. 3b.

FIG. 3a and FIG. 3b show supplying the sensor 22, as represented by the resistor R2, via a bridge rectifier 2 composed of the diodes D1, D2, D3, D4. The alternating voltage applied on the left in FIGS. 3a/b from the interface L1 is converted into a pulsating direct voltage. Since a two-way rectification is being applied, the negative half oscillation of the alternating voltage appears in the DC circuit exclusively in positive form on the consumer R2. There are always two diodes, through which electrical current is flowing, while the other two are blocked (see below). For improvement after the rectification, there is a smoothing, for which purpose the bridge rectifier 101 and the capacitors C1 and C3 are provided (see likewise below).

The figures further show a modulation circuit 5, more exactly a load modulation circuit, comprising the resistor R4 as well as the capacitor C4. In given cases, the capacitor C4 can be omitted. The load modulation occurs by means of the switch W1 connected with the load R4 and C4.

Additionally shown is a demodulation circuit 4 comprising the resistor R5, coil L3 and capacitor C5 for the receipt of telegrams via the inductive interface L1. The switch W1 can be, for instance, a transistor, preferably a field effect transistor, especially preferably a MOSFET, especially preferably a normally blocking n-channel MOSFET. The coil L3 can, in given cases, be omitted.

Shown also is a supply circuit 3 comprising the capacitors C1 and C3 for stabilizing, respectively smoothing, and including bridge rectifier 101. The bridge rectifier is embodied, for instance, as a fixed voltage regulator or as a direct voltage converter.

The respective circuit parts are drawn in dashed blocks in FIG. 3b.

Applied to the inductive interface L1 is a carrier signal. The carrier signal is an alternating signal having a positive half-wave and a negative half-wave.

The first diode D1 and the second diode D2 conduct in the case of a positive half-wave, wherein the first contact L1.1 of the interface L1 is connected with the anode of the first diode D1. In other words, the electrical current flow in the case of a positive half-wave goes from the first contact L1.1 via the first diode D1, the supply circuit 3, the load R2 and C3 via the second diode D2 back to the interface L1 at the second contact L1.2.

In the case of a negative half-wave, the third diode D3 and the fourth diode D4 are conducting, wherein the second contact L1.2 of the interface L1 is connected with the anode of the third diode D4. In other words, the electrical current flow in the case of a negative half-wave goes from the second contact L1.2 via the third diode D3, the demodulation circuit 4, the load R2 and C3 via the fourth diode D4 back to the interface L1 at the first contact L1.1.

The power of the negative half-wave is now fed via the rectification with the diodes D4 and D5 at the supply circuit 4 for the most part to the positive operating voltage $U_{C3}$.

The power consumption of the circuit is identical to the circuit according to the state of the art in FIG. 1. However, instead of, for example, 3 mW, 3.7 mW is now available to the positive operating voltage. There is an increase of the available power for the positive operating voltage by 25%. Therewith, sensors 22 using an inductive interface L1 can now be implemented, which were previously not implementable for reasons of power.

The invention claimed is:
1. An electronic circuit, comprising:
a galvanically isolating, inductive interface having a first contact and a second contact;
a first rectifier including a first diode and a second diode, wherein an anode of the first diode is connected to the first contact and a cathode of the second diode is connected to the second contact;
a second rectifier including a third diode and a fourth diode, wherein an anode of the third diode is connected to the second contact and a cathode of the fourth diode is connected to the first contact;
a supply circuit including a smoothing capacitor and a voltage controller, the supply circuit connected between the first diode and the second diode;
a demodulation circuit including at least one resistor-capacitor unit, the demodulation circuit connected between the third diode and the fourth diode, wherein the demodulation circuit is embodied to demodulate an input data signal from a carrier signal; and
a modulation circuit including a resistor and a switch, the modulation circuit connected to the first contact, wherein the modulation circuit is embodied to modulate an output data signal onto the carrier signal,
wherein an output of the demodulation circuit and an output of the supply circuit are connected together, and the demodulation circuit and the supply circuit are embodied to supply power to a consumer,
wherein the first rectifier is disposed such that a positive current induced in the inductive interface is conducted from the first contact through the first rectifier and the supply circuit and such that a negative current induced in the inductive interface is not conducted through the first rectifier and the supply circuit, and
wherein the second rectifier is disposed such that the negative current induced in the inductive interface is conducted from the second contact through the second rectifier and the demodulation circuit and such that the positive current induced in the inductive interface is not conducted through the second rectifier and the demodulation circuit.

2. The electronic circuit as claimed in claim 1, wherein the modulation circuit includes a capacitor connected in parallel with the resistor.

3. The electronic circuit as claimed in claim 1, wherein the switch, includes a normally blocking, n-channel MOSFET.

4. The electronic circuit as claimed in claim 1, wherein the voltage controller is a fixed voltage regulator or a direct voltage converter.

5. A method for demodulating an input data signal from a carrier signal, for modulating an output data signal on the carrier signal, and for supplying a consumer with power, wherein the carrier signal is an alternating signal having a positive half-wave and a negative half-wave, the method comprising:
providing an electronic circuit including:
a galvanically isolating, inductive interface having a first contact and a second contact;
a first rectifier including a first diode and a second diode, wherein an anode of the first diode is connected to the first contact and a cathode of the second diode is connected to the second contact;
a second rectifier including a third diode and a fourth diode, wherein an anode of the third diode is connected to the second contact and a cathode of the fourth diode is connected to the first contact;
a supply circuit including a smoothing capacitor and a voltage controller, the supply circuit connected between the first diode and the second diode;
a demodulation circuit including at least one resistor-capacitor unit, the demodulation circuit connected between the third diode and the fourth diode, wherein the demodulation circuit is embodied to demodulate an input data signal from a carrier signal; and
a modulation circuit including a resistor and a switch, the modulation circuit connected to the first contact, wherein the modulation circuit is embodied to modulate an output data signal onto the carrier signal,
wherein an output of the demodulation circuit and an output of the supply circuit are connected together, and the demodulation circuit and the supply circuit are embodied to supply power to a consumer,
wherein the first rectifier is disposed such that a positive current induced in the inductive interface is conducted from the first contact through the first rectifier and the supply circuit and such that a negative current induced in the inductive interface is not conducted through the first rectifier and the supply circuit, and
wherein the second rectifier is disposed such that the negative current induced in the inductive interface is conducted from the second contact through the second rectifier and the demodulation circuit and such that the positive current induced in the inductive interface is not conducted through the second rectifier and the demodulation circuit;
out-coupling the carrier signal from the galvanically isolating, inductive interface;
rectifying the carrier signal;
supplying the consumer with power via the supply circuit;
demodulating the input data signal from the carrier signal by the demodulation circuit, wherein the demodulation circuit is connected with the consumer;
supplying the consumer with power via the demodulation circuit; and
modulating the output data signal on the carrier signal.

6. The method of claim 5, wherein the consumer is a conductivity sensor, an oxygen sensor, or an optical sensor.

7. A field device, comprising:
a first electronic circuit, including:
a first galvanically isolating, inductive interface having a first contact and a second contact;
a first rectifier including a first diode and a second diode, wherein an anode of the first diode is connected to the first contact and a cathode of the second diode is connected to the second contact;
a second rectifier including a third diode and a fourth diode, wherein an anode of the third diode is connected to the second contact and a cathode of the fourth diode is connected to the first contact;
a supply circuit including a smoothing capacitor and a voltage controller, the supply circuit connected between the first diode and the second diode;
a demodulation circuit including at least one resistor-capacitor unit, the demodulation circuit connected between the third diode and the fourth diode, wherein the demodulation circuit is embodied to demodulate an input data signal from a carrier signal; and a modulation circuit including a resistor and a switch, the modulation circuit connected to the first contact, where in the modulation circuit is embodied to modulate an output data signal onto the carrier signal, wherein an output of the demodulation circuit and an output of the supply circuit are connected together, and the demodulation circuit and the supply circuit are embodied to supply power to a consumer, wherein the first rectifier is disposed such that a positive current induced in the inductive interface is conducted from the first contact through the first rectifier to the supply circuit and such that a negative current induced in the inductive interface is not conducted through the first rectifier, and wherein the second rectifier is disposed such that the negative current induced in the inductive interface is conducted from the second contact through the second rectifier to the demodulation circuit and such that the positive current induced in the inductive interface is not conducted through the second rectifier;

a conductivity sensor, an oxygen sensor, or an optical sensor; and a second electronics circuit including a second galvanically isolating, inductive interface, wherein the second inductive interface is embodied to inductively couple with the first inductive interface, and wherein the second electronics circuit is embodied to transfer energy and data through the second inductive interface to the first electronics circuit and to receive data through the second inductive interface from the first electronics circuit.

8. The field device of claim 7, wherein the optical sensor is a turbidity sensor or a sensor for optically determining pH.

* * * * *